May 26, 1970      A. E. TSCHANZ      3,513,719
MOTION TRANSMITTING REMOTE CONTROL ASSEMBLIES
Filed June 24, 1968
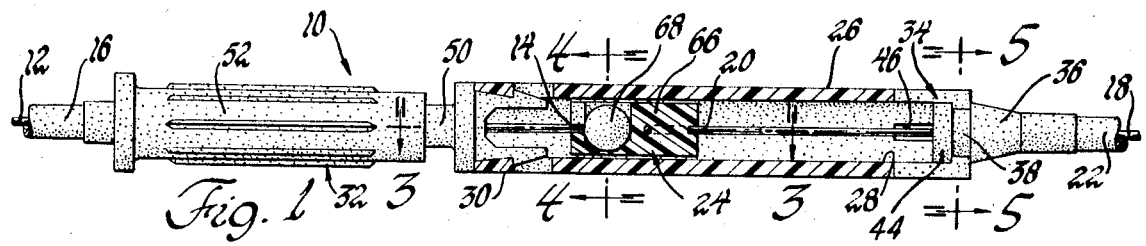
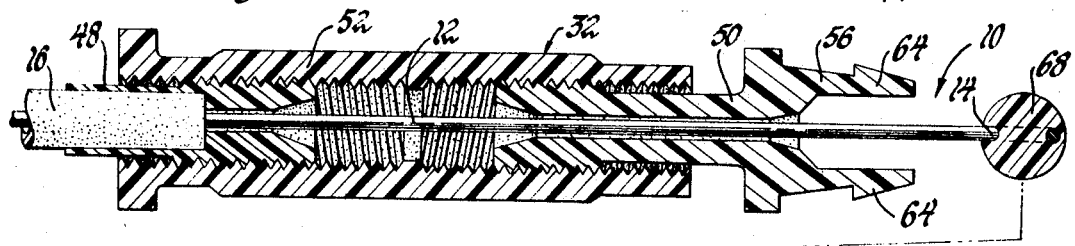
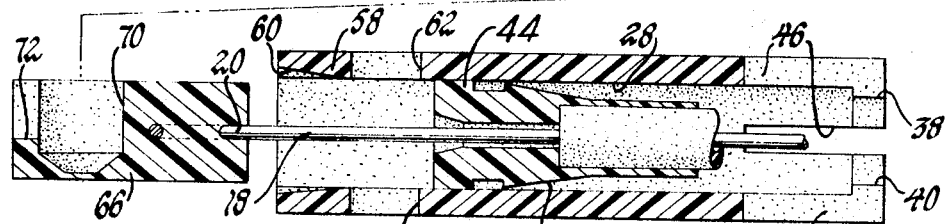
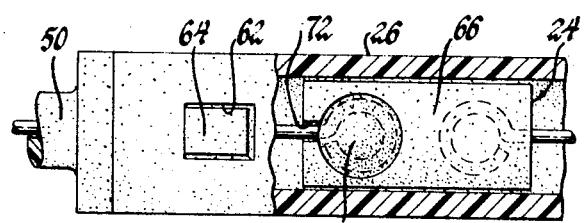
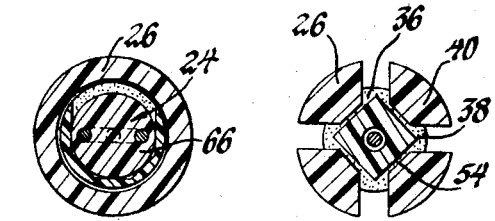
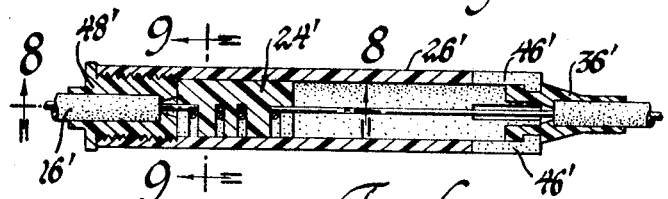
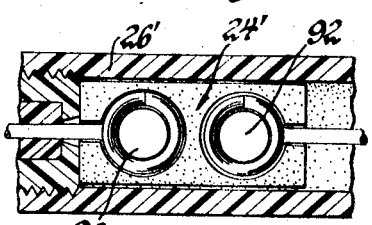
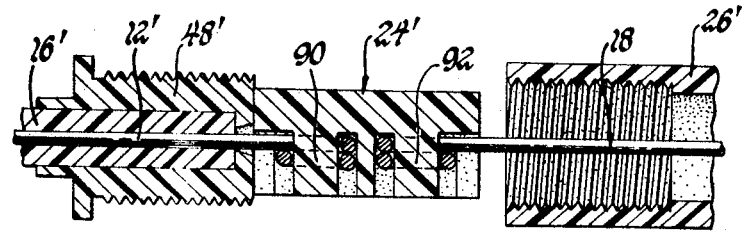
INVENTOR.
August E. Tschanz
BY
Barnard, McGlynn & Reising
ATTORNEYS

United States Patent Office 3,513,719
Patented May 26, 1970

3,513,719
MOTION TRANSMITTING REMOTE CONTROL ASSEMBLIES
August E. Tschanz, Birmingham, Mich., assignor to Teleflex Incorporated, North Wales, Pa., a corporation of Delaware
Filed June 24, 1968, Ser. No. 739,524
Int. Cl. F16c 1/06, 1/14, 1/16, 1/26
U.S. Cl. 74—501
27 Claims

ABSTRACT OF THE DISCLOSURE

The interconnection of first and second push-pull control assemblies by a first plastic fitting being secured to the end of a conduit of the first assembly and snapped into engagement with a sleeve which at the other end has snapped thereinto a male fitting. The male fitting has threads thereon which coact with the threads in a coupling member and the coupling member has threads at the other end thereof coacting with a threaded fitting disposed on the end of a conduit of the second assembly. Each assembly includes a motion transmitting wire-like core element and the core elements are interconnected by a plastic fastening means. In an alternative embodiment, the fitting on the end of the second conduit is in direct threaded engagement with the sleeve and the other end of the sleeve is in mechanical interlocking engagement with the fitting disposed on the conduit of the first assembly.

---

This invention relates to a motion transmitting remote control assembly of the type normally utilized to transmit motion in a curved path by a flexible motion transmitting core element.

Remote control assemblies of the type to which the instant invention pertains typically include a conduit which movably supports a motion transmitting core element and fittings secured to the ends of the conduit with the fittings being adapted to be attached to a support structure. Motion is transmitted between the ends of the conduit by reciprocating the core element within the conduit. Such remote control assemblies are frequently installed in aircraft, marine vehicles, automobiles, and like equipment. For example, such remote control assemblies are frequently utilized as push-pull control assemblies in automobiles for positioning vents or controlling heaters and the like. Normally, one end of the remote control assemblies is attached to the dashboard or instrument panel area of the automobile while the other end is disposed adjacent the particular element to be controlled, such as a heater or vent.

The design of some automobiles has created a problem in utilizing heretofore known remote control assemblies. After the sections of the automobile, to which opposite ends of the conduit of such remote control assemblies are to be attached, are assembled into the automobile, one or more of these sections are inaccessible and the ends of the conduit of the remote control assembly cannot be attached thereto. There is therefore a need for a satisfactory remote control assembly which may have one of its ends attached to a section of an automobile before the section is assembled into the automobile and also have its opposite end attached to a section of the automobile before it is assembled into the automobile and whereupon the two parts of the remote control assembly may be connected together after the sections of the automobile are assembled together.

Remote control assemblies having separate and connectable sections are known in the prior art; however, such assemblies have not proven satisfactory mainly because of their complexity. The problem with the prior art assemblies is that the total length of the core element when connected together is rather critical as is the total length of the conduit. Therefore, there exists the requirement to make special provision for attaching the core elements of the two sections together before interconnecting the conduits of the two sections.

In one such prior art assembly, provision for connecting the core elements is provided by attaching tubular members to the respective ends of the conduits with the distal or free ends of each of the tubular members being chamfered or angulated to provide easy access for connecting the two core elements together. After the core elements are connected together a generally U-shaped pin is inserted through loops on the respective tubular members to space the tubular members apart. Thereafter, a sleeve which surrounds one of the tubular members is moved therealong and across the open space between the two tubular members to engage the other tubular member and maintain the tubular members in alignment.

In another such remote control assembly which has separate sections which may be connected together, the adjacent ends of the two conduits of the two sections have mating members secured thereto. In other words, the core elements of the two sections may be united and thereafter the mating members attached to the respective conduits may be moved into mating overlapping and locking engagement with one another.

It will be readily appreciated that the remote control assemblies known in the prior art, which may be separated into sections, are very complex, very cumbersome to manipulate, susceptible to malfunction and expensive to manufacture.

Accordingly, it is an object and feature of this invention to provide a motion transmitting remote control assembly including first and second core elements slidable respectively in first and second guide means with fastener means for connecting the core elements together and a single and sole means for interconnecting the guide means which is movable longitudinally along one of the guide means to allow the core elements to be connected together prior to interconnecting the guide means.

In correlation with the foregoing object and feature, another object and feature of this invention is to provide such an assembly wherein each guide means includes a flexible conduit with a fitting disposed on the respective ends of the conduits with a sleeve means having a bore extending between the ends thereof being slidably disposed on one of the conduits and over the fitting thereof which is slidably disposed in the bore of the sleeve means and including means for preventing the fitting in the sleeve means from being pulled from the sleeve means.

Other objects and attendant advantages of the present invention will be readily appreciated as the same becomes better understood by reference to the following detailed description when considered in connection with the accompanying drawings wherein:

FIG. 1 is a fragmentary view partially in cross section showing a preferred embodiment of a motion transmitting remote control of the instant invention;

FIG. 2 is an enlarged cross sectional view of the embodiment of FIG. 1 and showing the two sections of the control separated;

FIG. 3 is an enlarged fragmentary cross sectional view taken along line 3—3 of FIG. 1;

FIG. 4 is an enlarged cross sectional view taken substantially along line 4—4 of FIG. 1;

FIG. 5 is an enlarged cross sectional view taken substantially along line 5—5 of FIG. 1;

FIG. 6 is a fragmentary cross sectional view of an alternative embodiment of the instant invention;

FIG. 7 is an enlarged fragmentary cross sectional view of the embodiment of FIG. 6;

FIG. 8 is an enlarged fragmentary cross sectional view taken substantially along 8—8 of FIG. 6; and FIG. 9 is an enlarged cross sectional view taken substantially along line 9—9 of FIG. 6.

Referring now to the drawings, wherein like numerals indicate like or corresponding parts throughout the several views, a preferred embodiment of the motion transmitting remote control made in accordance with the instant invention is generally shown at 10.

The control includes a first motion transmitting core element 12 having first and second ends. The first end of the core element 12 is indicated at 14 while the second end thereof is not shown and extends to a position where it may be connected to a control element or an element to be controlled. A first guide means comprising the flexible conduit 16 movably supports the first core element 12 and has first and second ends. The first end of the conduit 16 is shown; however, the second end is not shown and as is well known in the art the second end is at a position adjacent a control element or an element to be controlled where it is attached to a support structure. Thus, the first core element 12 is of a length that the first and second ends thereof extend respectively from the first and second ends of the conduit 16.

A second motion transmitting core element 18 is included and has first and second ends, and like the core element 12 only the first end 20 is shown.

A second guide means comprising the conduit 22 movably supports the second core element 18 and has first and second ends with only the first end being shown. The second core element 18 is of a length that its first and second ends extend respectively from the first and second ends of the conduit 22.

There is also included fastener means generally indicated at 24 for connecting the first ends 14 and 20 of the core elements 12 and 18 together so that the core elements 12 and 18 will move together.

A sleeve means comprising a tubular member 26 interconnects the first ends of the conduits 16 and 18. The sleeve means 26 has a circular bore 28 therein and slidably supports the fastening means 24 in the bore 28. The sleeve means 26 has a first end 30 for connection to the first end of the conduit 16 through an adjustment means generally indicated at 32, which will be described more fully hereinafter.

There is also included connector means generally indicated at 34 to interconnect the second end of the sleeve means 26 and the first end of the conduit 22 for allowing the sleeve means 26 to move longitudinally along the second conduit 22. More specifically, the connector means 34 includes a first fitting 36 attached to the conduit 22 at the first end thereof and coacting means at the second end of the sleeve means 26 to coact with the first fitting 36 for preventing the first fitting 36 from moving out of the second end of the sleeve means 26. The coacting means comprises a tongue and groove means including the groove 38 and the lugs 40 for snapping into mechanical interlocking engagement with one another to prevent relative longitudinal movement between the sleeve means 26 and the conduit 22. The first fitting 36 includes an outwardly tapered portion 42 which extends from the conduit 22 to an enlarged portion 44. The groove 38 is disposed in the enlarged portion 44. Slots 46 extend longitudinally into the sleeve means 26 from the second end thereof for allowing the lugs 40 to flex radially outwardly as the first fitting 36 is moved from the position illustrated in FIG. 2 to the mechanical interlocking position shown in FIG. 1 wherein the lugs 40 are disposed in the groove 38. It will be noted that the lugs 40 extend radially into the bore 28 and are disposed adjacent the second end of the sleeve means 26 for engaging the groove 38 in the fitting 36 to prevent relative longitudinal movement between the conduit 22 and the sleeve means 26.

The adjustment means 32 interconnects the conduit 16 and the sleeve means 26 and is operable for adjusting the distance between the first and second conduits 16 and 22. As is known in the art, and as is explained in U.S. Pat. 3,289,491, the distance the opposite ends of the core element extend from the ends of the conduit is determined by the length of the conduit between those ends when the ends of the conduit are fixed. The adjustment means is desirable in a remote control assembly having separable sections because once the two sections are connected together, the adjustment means may be operated to correct all errors and tolerances after the conduits and core elements have been connected.

The adjustment means 32 includes a second fitting 48 attached to the conduit 16 and a third fitting 50 connected to the sleeve means 26. Also included in the adjustment means 32 is a rotatable coupling member 52 which interconnects the second and third fittings 48 and 50. The second fitting 16 has threads thereon and the third fitting 50 has threads thereon and the coupling member 52 threadedly engages the threads on the second and third fittings 48 and 50 so that the distance between the conduits will vary upon rotation of the coupling member. It will be noted that the threads at opposite ends of the coupling member 52 are opposite in lead so that as the coupling member 52 is in rotation in one direction, the fittings 48 and 50 will be moved apart whereas upon rotation of the coupling member 52 in the opposite direction, the fittings 48 and 50 will be moved together.

Because the length of the total guide means, or conduits which house the core elements, would change upon relative rotation between the coupling member 52 and either of the fittings 48 and 50, the groove 32 is made square and the lugs 40 form a square opening so that there is included four coacting planar surfaces between the lugs 40 and the groove 38 to prevent relative rotation between the sleeve means 26 and the first fitting 36. There is no relative rotation between the fitting 50 and the sleeve means 26 thus, no inadvertent relative rotation can take place with the coupling member 52 to change the overall length of the control.

The third fitting 50 includes a male snap-in portion 56 and the sleeve means 26 includes a receiving portion 58. The receiving portion 58 receives and retains the snap-in portion 56 to prevent relative longitudinal and rotative movement between the third fitting 50 and the sleeve means 26. It will be noted that the sleeve means 26 is tapered at 60 and has a cross bore 62 for receiving the snap-in portion 56 so that the tangs 64 thereof snap into the cross bore 62, such position being illustrated in FIG. 1. In the preferred embodiment the conduits 16 and 22 have an outer casing of organic polymeric material and all of the components except the wire-like core elements 12 and 18 are made of organic polymeric or plastic materials.

The fastening means 24 includes first and second portions. The first portion being indicated at 66 and the second portion being indicated at 68. First ends of the core elements 12 and 18 have loops therein and the respective loops are in mechanical interlocking engagement with the respective first and second portions 66 and 68. The first portion includes an open socket 70 therein and the second portion 68 is a spherical ball disposed in the socket 70. The first portion 66 has a slot 72 therein so that the core element 12 can extend therethrough when the ball 68 is in the socket 70. The cross sectional configuration of the portion 66 is circular and generally conforms to the bore 28 in the sleeve means 26.

In FIGS. 6 through 9 there is disclosed an alternative embodiment which may be broadly described in the same terminology as used above to describe the embodiment of FIGS. 1 through 5. This embodiment includes a first fitting 36' which is mechanically secured to the sleeve means 26' in the same manner as fitting 36 of the first described embodiment. The sleeve means 26' has slots 46' therein. This embodiment differs, however, by utilizing a different fastening means 24' and a different connection between the sleeve means 26' and the conduit 16'. The conduit 16' has a fitting 48' attached thereto which threadedly engages the end of the sleeve means 26'. In this embodiment, therefore, the groove and tongue connection between the fitting 36' and the sleeve means 26' is not square but is circular so as to allow the sleeve means 26' to rotate relative to the fitting 36' so that the threaded coaction between the sleeve means 26' and the fitting 48' will adjust the overall length of the assembly.

The fastening means 24' is one integral member including a first portion comprising a post 90 and a second portion comprising a post 92. The core elements 12' and 18' have loops in the ends thereof through which the respective posts extend.

In each of the described embodiments, therefore, the respective ends of the sections of the control may be attached to different sections of an automobile or similar vehicle before the sections are assembled in the vehicle. Once the sections are assembled into the vehicle, the core elements of the two parts of the control as well as the conduits thereof may be connected together. In so doing, the sleeve means is slidable longitudinally along one of the conduits so as to expose the fastening means whereby the core elements may be attached together. In the embodiment of FIGS. 1 through 5, the sleeve means 26 is moved to the left from the position illustrated in FIG. 2 to the position illustrated in FIG. 1 where the lugs 40 engage the groove 38. While this is being accomplished the male snap-in portion 56 is snapped into mechanical interlocking engagement with the receiving portion of the sleeve means 26. Thereafter the length of the assembly may be adjusted by rotating the coupling member 52. In the embodiment of FIGS. 6 through 9, the core elements are connected together by the fastening means 24' and thereafter the sleeve means 26' is moved to the left to move the lugs thereof up the tapered portion of the fitting 36' and into the groove of the fitting 36'. The sleeve means 26' is rotated into threaded engagement with the fitting 48'.

The invention has been described in an illustrative manner and it is to be understood that the terminology which has been used is intended to be in the nature of words of description rather than of limitation.

Obviously, many modifications and variations of the present invention are possible in light of the above teachings.

The embodiments of the invention in which an exclusive property or privilege is claimed are defined as follows:

1. A motion transmitting remote control comprising: a first motion transmitting core element having first and second ends, first guide means for movably supporting said first core element and having first and second ends, said first core element being of a length that said first and second ends may extend respectively from said first and second ends of said first guide means, a second motion transmitting core element having first and second ends, second guide means for movably supporting said second core element and having first and second ends, said second core element being of a length that said first and second ends thereof may extend respectively from said first and second ends of said second guide means, fastener means for connecting said first ends of said first and second core elements together so that said core elements will move together, sleeve means for interconnecting said first ends of said first and second guide means in spaced relationship to one another and for slidably supporting said fastener means between said spaced first ends, said sleeve means having a first end thereof for connection to said first end of said first guide means, and connector means to interconnect the second end of said sleeve means and said first end of said second guide means for allowing said sleeve means to move longitudinally along said second guide means.

2. A control as set forth in claim 1 wherein said second guide means includes a first flexible conduit, said connector means includes a first fitting attached to said conduit at a first end thereof, said sleeve means having a bore extending between the ends thereof, said first fitting being slidable in said bore, coacting means at said second end of said sleeve means to coact with said first fitting for preventing said first fitting from moving out of said second end of said sleeve means.

3. A control as set forth in claim 2 wherein one of said first fitting and said coacting means is radially flexible and includes a tongue and groove means for snapping into mechanical interlocking engagement with one another for preventing relative longitudinal movement between said sleeve means and said first conduit.

4. A control as set forth in claim 3 wherein said first fitting includes an outwardly tapered portion extending from said first conduit to an enlarged portion thereof, said tongue and groove means including a groove in said enlarged portion.

5. A control as set forth in claim 4 wherein said sleeve means includes slots extending longitudinally thereinto from said second end thereof for allowing radial flexing thereof, and said tongue and groove means includes lugs extending radially into said bore and adjacent said second end of said sleeve means for engaging said groove in said first fitting to prevent relative longitudinal movement between said first conduit and said sleeve means.

6. A control as set forth in claim 5 wherein said first guide means includes a second flexible conduit, adjustment means to interconnect said second conduit and said sleeve means and operable for adjusting the distance between said first and second conduits.

7. A control as set forth in claim 6 wherein said lugs and said groove each include at least one planar surface for coacting together to prevent relative rotation between said sleeve means and said first fitting.

8. A control as set forth in claim 7 wherein said adjustment means includes a second fitting attached to said second conduit, a third fitting connected to said sleeve means, and a rotatable coupling member interconnecting said second and third fittings and threadedly engaging at least one of said second and third fittings.

9. A control as set forth in claim 8 wherein said third fitting and said first end of said sleeve means include a snap-in portion and a receiving portion for receiving and retaining said snap-in portion to prevent relative longitudinal and rotative movement between said third fitting and said sleeve means.

10. A control as set forth in claim 9 wherein said second fitting has threads thereon and said third fitting has threads thereon, said coupling member threadedly engaging said threads on said second and third fittings so that the distance between said conduits will vary upon rotation of said coupling member.

11. A control as set forth in claim 10 wherein said fastener means is made of organic polymeric material and includes first and second portions, said first core element being in mechanical interlocking engagement with said first portion, said second core element being in mechanical interlocking engagement with said second portion.

12. A control as set forth in claim 11 wherein each of first ends of said core elements has a loop therein and said loops are in said engagement respectively with said first and second portions.

13. A control as set forth in claim 12 wherein said first and second portions are integral with one another.

14. A control as set forth in claim 12 wherein said first and second portions of said fastening means are separate and independent from one another.

15. A control as set forth in claim 14 wherein said first portion is disposed about said loop in said first core element and has an open socket therein, said second portion is disposed about said loop in said second core element and is spherical and is disposed in said socket, said first portion having a slot extending thereinto and to said socket so that said second core element may extend therethrough.

16. A control as set forth in claim 14 wherein said first portion is a post extending through said loop in said first core element and said second portion is a post extending through said loop in said second core element.

17. A control as set forth in claim 14 wherein said bore in said sleeve means is circular and said fastening means has a generally circular cross section and is slidable in said bore.

18. A control as set forth in claim 2 wherein said first guide means includes a second flexible conduit, a second fitting attached to said second conduit, and means for interconnecting said second fitting and said sleeve means.

19. A control as set forth in claim 18 wherein said last-mentioned means comprises threads respectively on said sleeve means and said second fitting.

20. A control as set forth in claim 19 wherein said first fitting and said coacting means include means for allowing relative rotation between said sleeve means and said first fitting.

21. A control as set forth in claim 18 wherein said means for interconnecting said second fitting and said sleeve means includes a snap-in portion and a receiving portion for receiving and retaining said snap-in portion to prevent relative longitudinal movement between said third fitting and said sleeve means.

22. A control as set forth in claim 21 including a third fitting, said snap-in portion being of said third fitting, a rotatable coupling member interconnecting said second and third fittings and threadedly engaging at least one of said second and third fittings for varying the distance between said first and second conduits.

23. A motion transmitting remote control comprising: a first motion transmitting core element having a first end, a second motion transmitting core element having a first end, and fastener means of organic polymeric material interconnecting said first ends of said core elements, said fastener means including first and second portions, said first core element being in mechanical interlocking engagement with said first portion, said second core element being in mechanical interlocking engagement with said second portion, each of said first ends of said core elements having a loop therein and said loops are in said engagement respectively with said first and second portions.

24. A control as set forth in claim 23 wherein said first and second portions of said fastening means are separate and independent from one another.

25. A control as set forth in claim 24 wherein said first portion is disposed about said loop in said first core element and has an open socket therein, said second portion is disposed about said loop in said second core element and is spherical and is disposed in said socket, said first portion having a slot extending thereinto and to said socket so that said second core element may extend therethrough.

26. A control as set forth in claim 23 wherein said first and second portions are integral with one another.

27. A control as set forth in claim 26 wherein said first portion is a post extending through said loop in said first core element and said second portion is a post extending through said loop in said second core element.

References Cited

UNITED STATES PATENTS

| | | | |
|---|---|---|---|
| 2,243,960 | 6/1941 | Hotchkiss | 64—4 |
| 2,586,360 | 2/1952 | Mall | 64—4 |
| 2,751,793 | 6/1956 | Sandberg | 74—502 |
| 2,893,221 | 7/1959 | Bell | 64—4 |
| 3,237,977 | 3/1966 | Batchelder. | |
| 3,289,491 | 12/1966 | Conrad | 74—501 |

JAMES A. WONG, Primary Examiner

U.S. Cl. X.R.

64—4